June 18, 1963     G. A. MONTGOMERIE     3,093,983
HYDRAULIC COUPLINGS

Filed March 12, 1962     2 Sheets-Sheet 2

United States Patent Office 3,093,983  
Patented June 18, 1963

3,093,983  
HYDRAULIC COUPLINGS  
George Alan Montgomerie, Leamington, England, assignor to Serck Radiators Limited, Birmingham, England  
Filed Mar. 12, 1962, Ser. No. 178,878  
Claims priority, application Great Britain Mar. 15, 1961  
3 Claims. (Cl. 64—26)

This invention relates to hydraulic couplings and has for its object the provision of a new or improved arrangement in which variation of output speed can be obtained in a relatively simple manner.

In accordance with the present invention, there is provided a hydraulic coupling comprising a pair of rotatable members namely a driving member and a driven member, which are also rotatable relative to each other, one of said members having a plurality of bores, a driving element mounted in each of said bores so as to be movable along the bore whilst remaining in sealing engagement with the wall thereof, a cam surface on the other of said members and disposed adjacent to said bores at one end thereof, the other end of each bore having a fluid port, and valve means for closing said ports when it is desired to transmit a drive between said members, the arrangement being such that in use each bore contains hydraulic fluid and each driving element is reciprocable within its bore and is arranged at one extreme position to project from the bore and engage said cam surface, closing of said port in the bore serving to prevent flow of fluid from the bore and movement of the driving element away from the cam surface so as thereby drivingly to couple said driving elements and cam surface.

Conveniently, the driving member is provided with the bores and in use each driving element is arranged to be urged towards the cam surface by means of centrifugal force, the axis of each bore extending transverse to the axis of rotation of the coupling.

Conveniently, each bore is of cylindrical configuration and each associated driving element may be in the form of a ball.

With the above-described arrangement no drive will be transmitted if fluid can flow freely into and out of each bore but as such flow of fluid is increasingly restricted by the aforementioned valve means drive will be transmitted to the driven member until finally all flow is prevented and the driving elements will be locked in their extreme driving positions, thus driving the driven member at a speed of rotation equal to the rotational speed of the driving member. The latter can, of course, be driven by any convenient means such as, for example, an internal combustion engine.

The valve means previously referred to may be controlled in any convenient manner either manually or automatically in reference to variation in some operating characteristic such as temperature or pressure.

Figure 1:
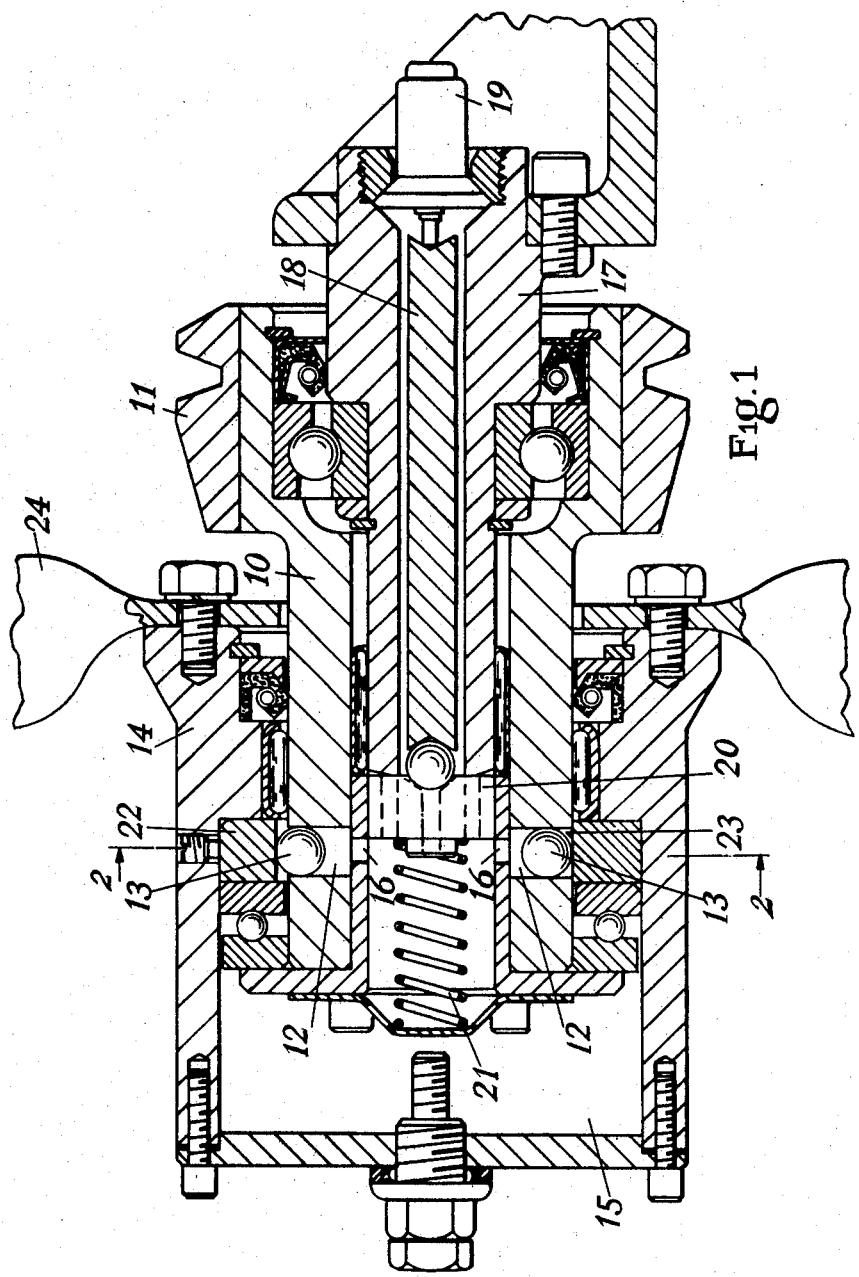
Figure 2:
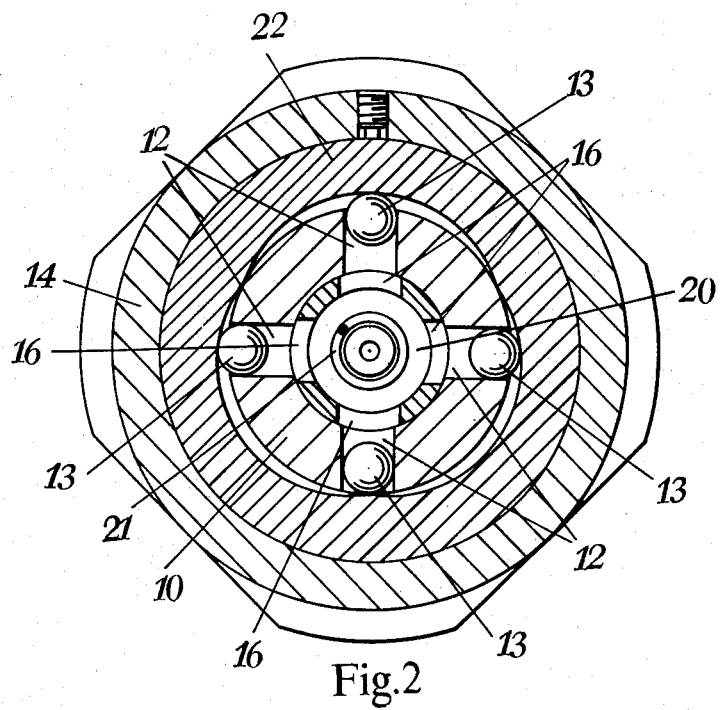

The invention will now be more particularly described with reference to the accompanying drawings in which FIGURE 1 is a sectional side view showing one example of an hydraulic coupling in accordance with the invention, and FIGURE 2 is a section on the line 2—2 of FIGURE 1.

Referring to the drawing there is provided a rotatable driving member in the form of a hollow shaft 10 which is adapted to be driven in any convenient manner. For instance one end of said hollow shaft may be provided with a pulley 11 which is connected in use by means of a belt drive to an internal combustion engine.

The hollow shaft is provided with a plurality of (for example four) cylindrical bores 12, the axis of said bores being disposed in a common plane perpendicular to the axis of said hollow shaft and each bore extending through the wall of the hollow shaft from the interior surface to the exterior surface thereof.

Mounted in each of said bores is a driving element in the form of a steel ball 13 which is in sealing engagement with the wall of the associated bore and which is capable of moving along the length of the bore, said ball being arranged in its outermost position to project outwardly from the outer end of the bore.

There is also provided a driven member 14 which is of annular form and which is mounted on said hollow shaft for rotation relative thereto. Between one end of said shaft 10 and the adjacent end of the driven member is a space 15 which forms a fluid reservoir, and each of said bores 12 has a port 16 at its inner end through which fluid can flow when the ports are open. There is however mounted within the interior of the shaft 10 a sleeve 17 in which is disposed a rod 18 which is engaged at one end by a thermally sensitive capsule or other element 19 and which is connected at the other end to valve means in the form of a plug 20. Thus said plug 20 is movable in one direction by said element 19 to close the ports 16, movement in the opposite direction being accomplished by a spring 21.

To the interior of said driven member is connected a member 22 having a cam surface 23 which is, for example, provided with three inwardly projecting lobes and the arrangement is such that when said balls 13 are in their outermost positions they will engage said cam surface. If the driving member 10 is now rotated whilst the aforementioned ports 16 are open fluid can flow freely into and out of said bores so that the steel balls will reciprocate within said bores, it being understood that they will move outwardly under the influence of centrifugal force and inwardly by the interaction between the balls and the cam surface. Thus whilst said balls can reciprocate within the bores little or no drive will be transmitted to the driven member.

On the other hand if flow of fluid into and out of the bores 12 is restricted then the balls 13 will not be able to move freely inwardly so that some drive will be transmitted to the driven member by the balls which will engage the cam surface and rotate the driven member 14. Restriction of the flow of fluid as aforesaid will be achieved when the plug 20 commences to close the ports 16. When said ports are completely closed all flow of fluid through the bores will be stopped and the balls 13 will remain in their outermost positions as the inner ends of the bores will be filled with fluid. Said balls 13 will thus be locked in said outermost positions and the rotation of the driving member will then be communicated to the driven member by reason of the engagement of said balls with the cam surface 23.

The above described hydraulic coupling may in one particular example be adapted for use in the cooling of an internal combustion engine mounted in a road vehicle. Thus in this application the driving member or hollow shaft 10 would be rotated by the internal combustion engine whilst the driven member would be connected to a fan 24 adapted to draw cooling air through the vehicle radiator. The heat sensitive capsule or other element 19 would be arranged in a chamber through which can flow the engine cooling medium so that when the latter reaches a predetermined temperature the element 19 will act to move the aforementioned plug 20, thereby restricting or interrupting the flow of fluid into and out of said bores and thus transmitting a drive to the driven member and thence to the fan 24 which will in turn promote cooling of said cooling medium.

Having thus described my invention what I claim as new and desire to secure by Letters Patent is:

1. A hydraulic coupling comprising in combination a rotatable driving member provided with a plurality of bores which extend inwardly from an outer peripheral surface of said driving member towards the axis thereof, a rotatable driven member which is mounted coaxially with said driving member, an annular member united with said driven member, and provided with an internal cam surface which is situated around, and adjacent to, the outer ends of said bores, a plurality of driving elements which are mounted respectively within, and movable along, said bores, and which are in constant sealing engagement respectively with the peripheries of said bores, a plurality of ports which communicate respectively with the inner ends of said bores, and through which hydraulic fluid is admissible to, and dischargeable from, said bores, and valve means for closing said ports to prevent discharge of hydraulic fluid from said bores when it is desired to transmit movement from said driving member to said driven member, said bores being arranged so that when said driving member is rotated said driving elements are urged by centrifugal forces to extreme positions in which they project from the outer ends of said bores into engagement with said cam surface, and are held in said extreme positions by the hydraulic fluid in said bores when said ports are closed by said valve means to prevent discharge of hydraulic fluid from said bores, so that said driving member is drivingly coupled to said driven member by the engagement of said driving elements with said cam surface.

2. A hydraulic coupling according to claim 1, wherein said driving member comprises a hollow shaft, the axes of said bores extend at right angles to the axis of said shaft, and said valve means is slidably mounted in the interior of said hollow shaft for closing and opening said ports.

3. A hydraulic coupling according to claim 2, and having a temperature responsive element operatively connected to said valve means for causing the latter to close said ports when said temperature responsive element attains a predetermined temperature.

References Cited in the file of this patent

UNITED STATES PATENTS

| 2,786,456 | Heiss | Mar. 26, 1957 |
| 2,890,687 | Richmond | June 16, 1959 |
| 2,900,811 | De Selms | Aug. 25, 1959 |

FOREIGN PATENTS

| 544,230 | Great Britain | Apr. 12, 1942 |